(12) United States Patent
D'Souza et al.

(10) Patent No.: US 7,283,461 B2
(45) Date of Patent: Oct. 16, 2007

(54) DETECTION OF DENIAL-OF-SERVICE ATTACKS USING FREQUENCY DOMAIN ANALYSIS

(75) Inventors: Scott D'Souza, Ottawa (CA); Paul Kierstead, Ottawa (CA)

(73) Assignee: Alcatel Canada Inc., Kanata, ON (CA)

( * ) Notice: Subject to any disclaimer, the term of this patent is extended or adjusted under 35 U.S.C. 154(b) by 1120 days.

(21) Appl. No.: 10/224,507

(22) Filed: Aug. 21, 2002

(65) Prior Publication Data

US 2004/0037229 A1    Feb. 26, 2004

(51) Int. Cl.
*H04J 11/00* (2006.01)
*H04J 1/16* (2006.01)

(52) U.S. Cl. .................... 370/210; 370/252
(58) Field of Classification Search ............. 370/210, 370/252
See application file for complete search history.

(56) References Cited

U.S. PATENT DOCUMENTS

| | | | |
|---|---|---|---|
| 6,296,612 B1 * | 10/2001 | Mo et al. | 600/455 |
| 7,002,913 B2 * | 2/2006 | Huang et al. | 370/230.1 |
| 7,072,297 B2 * | 7/2006 | Grosdidier et al. | 370/231 |
| 2002/0103916 A1 | 8/2002 | Chen et al. | |
| 2006/0146869 A1 * | 7/2006 | Zhang et al. | 370/465 |

FOREIGN PATENT DOCUMENTS

WO    WO 01/80480 A1    10/2001

OTHER PUBLICATIONS

"The SRI IDES Statistical Anomaly Detector", Harold S. Javitz et al., Proceedings of the Symposium on Research in Security and Privacy, May 20-22, 1991, IEEE Comp. Soc. Press, Vol. Symp. 12, pp. 316-326.
"Basic Principles of the Spectral Analyses with Discrete Fourier Transformation", (Part 5), D. Kress et al., Nachrichtentechnik Elektronik, vol. 37, No. 9, pp. 348-352.
"Basics of the Dynamic Signal Analysis", Jul. 1991, Hewlett Packard S.A., ISBN: 5952-8898, pp. 21-51.
"Probabilistic Techniques for Intrusion Detection Based on Computer Audit Data", IEEE Transactions on Systesm, Man and Cybernetics. Ye, Nong et al., IEEE Service Center, vol. 31, No. 4, Jul. 2001, pp. 266-274, ISSN:1083-4427.

* cited by examiner

*Primary Examiner*—Andrew C. Lee
(74) *Attorney, Agent, or Firm*—Marks & Clerk; S. Mark Budd

(57) ABSTRACT

Methods and apparatus for detecting denial of service attacks on a system in a communications network are provided. A frequency analysis is performed on certain types of packets that arrive with a periodic nature. A frequency power spectrum obtained through Fourier Transform reveals whether the power level of any particular frequency is greater than the average power spectrum. The detection of a higher than average power level is an indication that an attack is in progress.

9 Claims, 2 Drawing Sheets

DETECTION OF DENIAL-OF-SERVICE ATTACKS USING FREQUENCY DOMAIN ANALYSIS

FIELD OF THE INVENTION

This invention relates to communications systems and more particularly to methods and apparatus for detecting security related attacks, such as denial of service attacks, in communications systems.

BACKGROUND

Attacks on web sites in recent years has resulted in severe disruption in network services. These attacks can take any one of a number of forms including, but not limited to, SYN flooding.

In a SYN flooding attack an attacker overloads a victim's site to the point where it cannot cope with incoming traffic. Such an attack, typically, focuses on an inherent characteristic of TCP based services.

Essentially, TCP services rely on a three-way hand shaking protocol on connection set up. A client wishing to make connection with a host sends a synchronization signal (SYN) to the host and the host responds to the client with a SYN acknowledgement (ACK) reply. The client then returns an acknowledgement and the connection is established.

Upon completion of a connection the client forwards a finish (FIN) packet to the host indicating that there will be no further data or packets directed to the host and the connection is thereafter closed.

In a SYN flooding attack the attacker will typically use a false or invalid source address such that when the host returns the SYN/ACK message it does not reach a valid client. Under the TCP protocol the host stores half opened connections i.e. connections for which the third leg of the three way protocol has not been completed for a set period of time or until a system time out occurs. If, during this time interval multiple new half opened connections are established at the host site the memory allocated to retaining such connections becomes swamped and eventually is unable to receive any more SYN packets. At this stage the server or host will crash or will not respond to any new connections and the site goes out of service. Because the host is unable to receive further data the attacker has been successful in generating what is known as a denial of service attack. Denial of service attacks have become an increasingly prevalent form of a security threat and the problem, so far, has been quite difficult to solve. Several countermeasures have been proposed and can be characterized as firewall and router filtering, operating system improvements, protocol improvements and intrusion detection.

Essentially, a denial of service attack involves blocking somebody's ability to use some service on a network. As such, Denial of Service (DoS) attacks are common across the Internet with many being launched daily at various targets. Many of the attacks involve specially constructed packets designed to either take advantage of the aforementioned flaws in software, or to tie up resources within devices (packet flooding attacks).

Several methods have been proposed for detecting packet flooding types of attacks. In a paper entitled, *Detecting SYN Flooding Attacks*, Proc. Infocom 2002, by H. Wang, D. Zhang, and K. G. Shin, packet counting algorithms have been proposed. These algorithms attempt to detect attacks by looking for asymmetry between streams of packets. For example in the above referenced paper TCP/IP SYN flooding attacks are detected by looking for differences between the number of SYN (start connection) and FIN (end connection) packets.

According to the Wang et al paper the detection method relies on a counting argument on the SYN and FIN packets of the TCP connections. Those packets should go in pairs in any well-behaved connections. Thus, the number of SYN packets should match roughly the number of FIN packets. The simplicity of this method lies in its stateless and low computation overhead, which make the detection mechanism itself immune to flooding attacks. This simplicity allows the detection to be performed in the leaf routers that connect end hosts to the Internet.

In a yet to be published paper entitled *SYN Flood Attacks: Last Mile Routers Detection* by S. D'Souza, B. Howard, P. Kierstead, J. M. Robert the proposed Wang et al solution is extended to examine the packets more rigorously, taking direction into account. Essentially this paper improves on the counting algorithms described in the Wang et al paper by looking at a bi-directional method of counting SYN and FIN packets.

Since the prior art solutions rely on symmetrical transactions they may only be suitable for situations where symmetry can be found between the packets being transferred (for example: SYN-FIN). This technique may not be suitable for attacks such as ICMP (Internet Control Message Protocol) echo floods (ping attacks).

SUMMARY OF THE INVENTION

The present invention provides a new method of detecting packet floods using frequency analysis techniques.

Unlike the prior art the present invention does not rely on relationships between different types of packets, but focuses on patterns found on one type of packet e.g. SYN packets. This makes the method suitable for detecting a larger range of attacks.

Therefore in accordance with the present invention there is provided a method and apparatus for performing a frequency analysis on the arrival occurrence of certain types of packets to detect packet flooding attacks whose packets arrive with a periodic nature.

BRIEF DESCRIPTION OF THE DRAWINGS

The invention will now be described in greater detail with reference to the attached drawings wherein.

DETAILED DESCRIPTION OF THE INVENTION

Typical packet flooding software consists of some code to generate a specific type of packet and then a loop for sending the packet to some victim. Loops of this sort are generally deterministic i.e. the time of execution does not vary much from iteration to iteration. The result of this is a string of "pulses", each a predictable amount of time apart travelling towards the victim.

From the victim's standpoint, packets normally arrive in a generally random manner (neglecting time-of-use). In a packet flooding attack, the victim sees a number of packets arriving, some from the attacker (signal), and other legitimate traffic (noise). The difficulty is found in distinguishing a packet flooding attack from a busy network.

In signal processing applications, frequency domain analysis is often used to detect signals embedded within a noise spectrum and the present invention makes use of this technique for the detection of packet flooding attacks.

Figure 1:
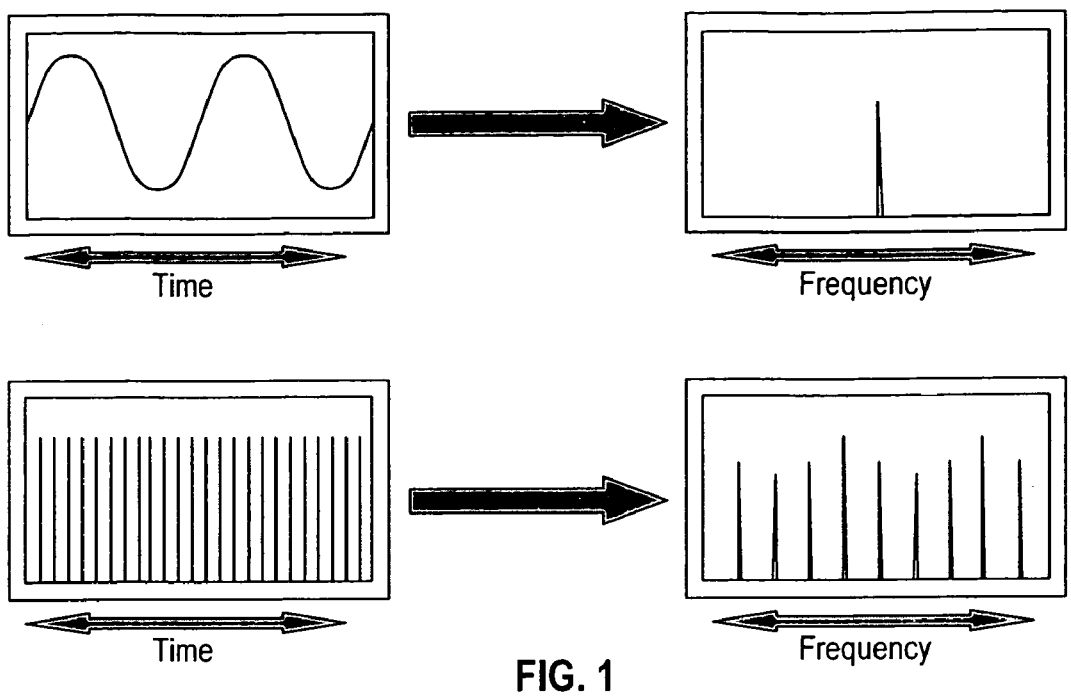
FIG. 1 illustrates the Fourier Transform algorithm to transfer a time domain signal into its frequency domain mapping.

Using frequency analysis a periodic data signal that might otherwise not be obvious can be detected. As shown in FIG. 1, Fourier Transform is used to transform a time domain signal into its frequency domain mapping. Discrete Fourier Transform (DFT) transforms a set of discrete samples of a time domain signal into a set of samples representing the frequency spectrum of the sample. A Fast Fourier Transform is a widely used algorithm for a faster calculation of the DFT.

According to the present invention occurrences of an input event (for example SYN packets) at a security checkpoint are sampled at a regular interval. After a specified window has passed, a Discrete Fourier Transform is performed upon the sample. As noted above a Fast Fourier Transform (FFT), higher performance implementation of the DFT), an be used to improve calculation time.

Figure 2:
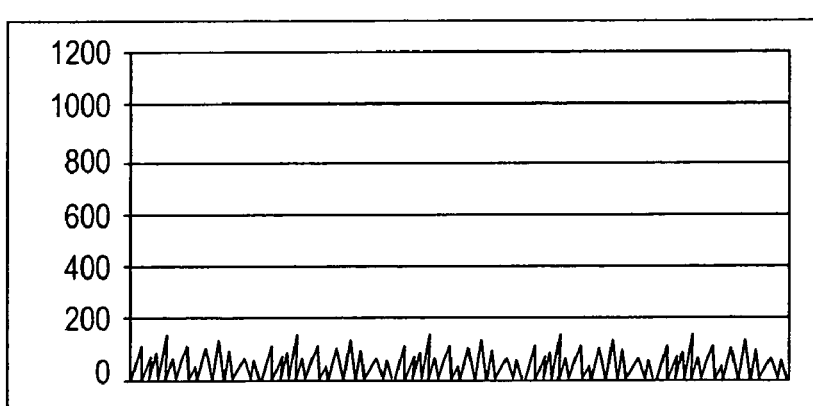
FIG. 2 illustrates the frequency spectrum of legitimate traffic.
Figure 3:
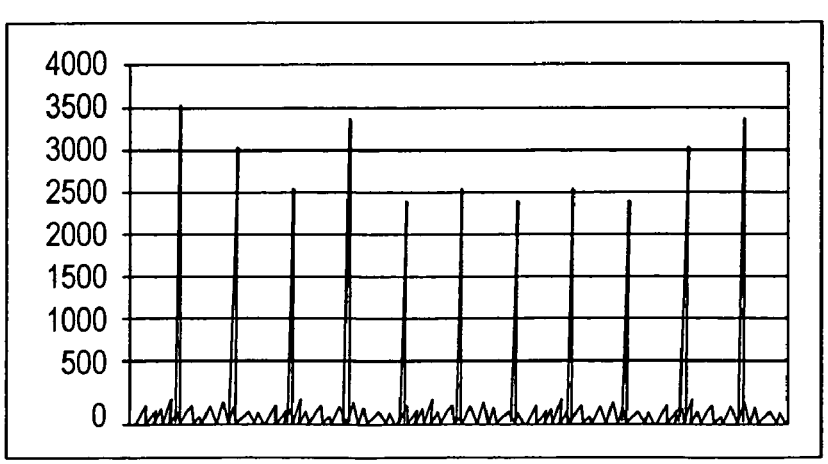
FIG. 3 illustrates the frequency spectrum of legitimate traffic and the frequency spectrum of attack traffic.

The DFT (FFT) produces the frequency power spectrum for the input sample. Events which occur randomly (noise) have their signal power evenly scattered across the frequency spectrum. A frequency spectrum of legitimate traffic (noise) is shown in FIG. 2. On the other hand, periodic signals, such as would occur in a flooding attack, will appear as a distinct line on the frequency spectrum which can be detected above the noise. FIG. 3 shows the frequency spectrum of a flooding attack superimposed on the frequency spectrum of legitimate traffic. If the power spectrum at a particular frequency is much higher than the average power, as shown in FIG. 3, an attack has been detected.

Signal windowing techniques can be used to improve the accuracy of the frequency spectrum and overcome the artifacts created from the finite sample period.

Figure 4:
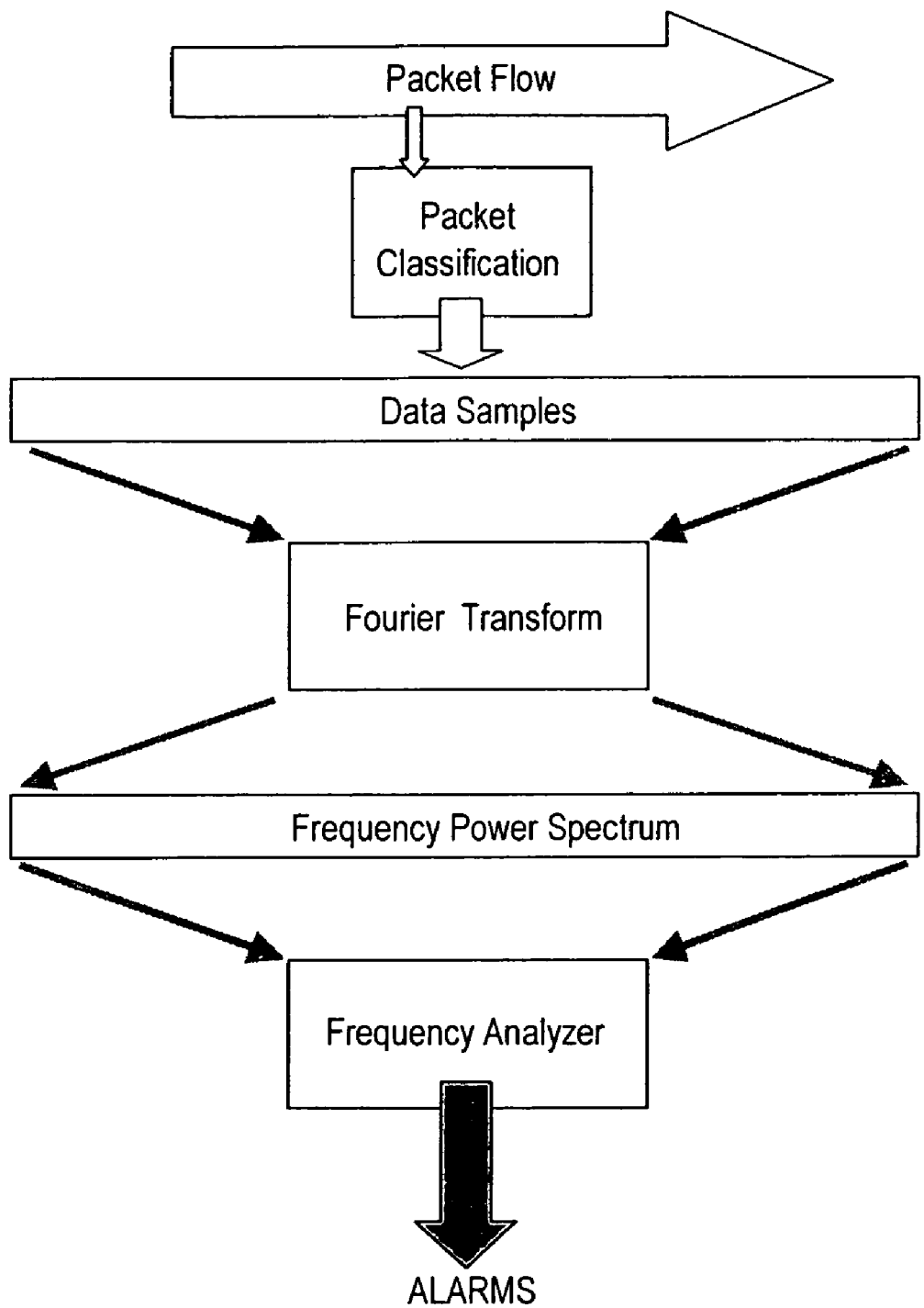
FIG. 4 is a block diagram of the attack detection protocol.

FIG. 4 is a block diagram of the attack detection process. As shown, packet classification is obtained from the flow of traffic at the security checkpoint. For a pre-selected type of packet, data samples are gather at a regular interval. A frequency power spectrum is derived from the data samples using a Fourier Transform. An attack is determined by comparing the power spectrum at any frequency against the average power spectrum. If there is a greater power spectrum at any frequency then an attack has been detected. An alarm or other detection notification is issued. The pre-selected type of packets includes SYN and ICMP packets. It is to be understood, however, that the present invention relates to the sampling of any regular interval events.

The solution provided here has several advantages over the prior art solutions. The use of only one event for analysis makes the approach applicable to more attacks than the counting type algorithms discussed in the aforementioned prior art. There is no need to find symmetries between two events for analysis.

Secondly more information about the nature of the attack can be gained from frequency analysis than from counting. Details about the rate of the attack can be used to discern the bandwidth capabilities of the attacker, and using information about the frequency of the attack, reacting to an attack may be possible.

In summary, the ability to detect DoS attacks can be of great value to operators of network services. DoS detection mechanisms, such as those described herein, may prove to be value-adding differentiators in the network equipment market.

Although particular embodiments of the invention have been described and illustrated it will be apparent to one skilled in the art that numerous changes can be implemented without departing from the basic concept. It is to be understood, however, that such changes will fall within the full scope of the invention as defined by the appended claims.

We claim:

1. A method of detecting a packet flooding attack on a system in a communication network, the method comprising the steps of:
   a) sampling, at regular intervals over a predetermined duration of time, packets of a pre-selected type received in a flow of traffic at a security point provided on said system, for obtaining a set of samples of said type of packets;
   b) mapping said set of samples from the time domain into the frequency domain to obtain a frequency power spectrum of the set of samples;
   c) calculating an average power of the frequency power spectrum for the flow of traffic over said predetermined duration of time; and
   d) comparing said frequency power spectrum of the set of samples with said average power and determining that a packet flooding attack has occurred when the power corresponding to any frequency in said frequency power spectrum of the set of sample is greater than the average power by a threshold amount.

2. The method as defined in claim 1 wherein step b) comprises performing a discrete Fourier Transform on said set of samples.

3. The method as defined in claim 1 wherein step b) comprises performing a Fast Fourier Transform on said set of samples.

4. The method as defined in claim 1 wherein the pre-selected type of packets includes SYN packets.

5. The method as defined in claim 1 wherein the pre-selected type of packets includes Internet Protocol ICMP packets.

6. An apparatus for detecting a packet flooding attack on a system in a communications network comprising:
   packet classification means for identifying packets of a pre-selected type received in a flow of traffic at a security point provided on said system and for sampling said pre-selected type of packets at regular intervals over a predetermined duration of time;
   means for producing a frequency power spectrum of said set of samples by mapping said set of samples from the time domain into the frequency domain;
   means for calculating an average power of the frequency power spectrum for the flow of traffic over said predetermined duration of time; and
   means for determining, responsive to the frequency power spectrum, that a packet flooding attack has occurred.

7. The apparatus as defined in claim 6 wherein the means for producing a frequency power spectrum utilizes a discrete Fourier transform.

8. The apparatus as defined in claim 6 wherein the means for producing a frequency power spectrum is utilizes a fast Fourier transform.

9. The apparatus as defined in claim 6 further comprising means for providing an alarm when a flooding attack has been detected by means for determining.

* * * * *